United States Patent [19]

Kuo et al.

[11] Patent Number: 6,061,768

[45] Date of Patent: May 9, 2000

[54] APPARATUS AND METHOD IN A NETWORK INTERFACE DEVICE FOR STORING TRACKING INFORMATION INDICATING STORED DATA STATUS BETWEEN CONTENDING MEMORY CONTROLLERS

[75] Inventors: Jerry Chun-Jen Kuo, San Jose; Autumn Jane Niu, Sunnyvale; Po-Shen Lai, San Jose, all of Calif.

[73] Assignee: Advanced Micro Devices, Inc., Sunnyvale, Calif.

[21] Appl. No.: 08/993,891

[22] Filed: Dec. 18, 1997

[51] Int. Cl.[7] .................................................... G06F 13/00
[52] U.S. Cl. ........................ 711/156; 711/170; 395/200.2
[58] Field of Search .................................... 709/250, 215, 709/234; 714/722, 811; 710/132; 711/156, 158, 170; 395/200.2

[56] References Cited

U.S. PATENT DOCUMENTS

| 4,672,570 | 6/1987 | Benken | 709/250 |
|---|---|---|---|
| 4,700,185 | 10/1987 | Balph et al. | 340/825 |
| 5,261,059 | 11/1993 | Hedberg et al. | 710/132 |
| 5,299,313 | 3/1994 | Petersen et al. | 709/234 |
| 5,319,752 | 6/1994 | Petersen et al. | 709/234 |
| 5,434,872 | 7/1995 | Petersen et al. | 714/811 |
| 5,687,316 | 11/1997 | Graziano et al. | 709/250 |
| 5,708,779 | 1/1998 | Graziano et al. | 709/250 |
| 5,732,094 | 3/1998 | Petersen et al. | 714/805 |
| 5,758,075 | 5/1998 | Graziano et al. | 709/250 |

*Primary Examiner*—John W. Cabeca
*Assistant Examiner*—Fred F. Tzeng

[57] ABSTRACT

A network interface device includes a random access memory used as a transmit and receive buffer for transmission and reception of data frames between a host computer bus and a packet switched network. The network interface device includes read and write controllers for each of the transmit and receive buffers, where each write controller operates in a clock domain separate from the corresponding read controller. The memory management unit also includes a synchronization circuit that controls arbitration for accessing the random access memory between the read and write controllers. The synchronization circuit determines the presence of a stored frame in the random access memory by asynchronously comparing write counter and read counter values stored in gray code counters, where each counter is configured for changing a single bit of a counter value in response to an increment signal. The determined presence of one or more stored data frames is used to arbitrate storage of tracking information by either the read controller or the write controller into a holding register used to determine a read status for the random access memory.

15 Claims, 6 Drawing Sheets

APPARATUS AND METHOD IN A NETWORK INTERFACE DEVICE FOR STORING TRACKING INFORMATION INDICATING STORED DATA STATUS BETWEEN CONTENDING MEMORY CONTROLLERS

BACKGROUND OF THE INVENTION

1. Technical Field

The present invention relates to network interfacing and more particularly, to methods and systems for buffering data between a host bus interface and a media access controller accessing Ethernet media.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by the MAC, and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa.

An additional problem caused by the buffering of data between the clock domain of the host computer and the clock domain of the network interface device is buffer overflow or under flow. For example, buffer overflow can occur when the time domains between the host bus and the network media are uncontrollable to the extent that data is stored in the buffer at a rate faster than the data can be removed, resulting in an overflow situation. Conversely, under flow occurs if data is removed from the FIFO buffer faster than the data can be supplied.

Hence, the non-synchronous relationship between the host bus clock domain and the network clock domain have required the necessity of FIFO buffers to compensate for timing discrepancies between the host computer and the network.

DISCLOSURE OF THE INVENTION

There is a need for an arrangement that enables use of a random access memory in a network controller, as opposed to a FIFO buffer, to compensate for timing discrepancies between the host computer and the network.

There is also a need for an arrangement enabling the use of a random access memory as a buffer in a network interface device, where potential synchronization problems between the clock domain of the host computer and the clock domain of the network are resolved to enable efficient control of the random access memory during the writing and reading of transmit or receive data.

There is also a need for an arrangement in a network interface device, where a synchronization circuit controls priority between writing and reading operations to and from the random access memory to enable efficient memory management for monitoring the status of stored frame data.

These and other needs are attained by the present invention, where a synchronization circuit is configured for determining a presence of a stored frame in a random access memory in response to first and second signals from respective write and read controllers operating according to respective clock domains, such that the synchronization circuit determines the presence of the stored frame independent of the first and second clocks to store tracking information indicating the status of a stored data frame.

According to one aspect of the present invention, a method for storing tracking information indicating a status of a data frame stored in a buffer memory, comprises storing the frame and corresponding first tracking information in a random access memory at a prescribed memory location using a write controller operating according to a first clock, supplying the first tracking information to a synchronization circuit having a holding register in response to the storing step, reading the frame from the random access memory using a read controller operating according to a second clock independent from the first clock, supplying the tracking information corresponding to the read frame to the synchronization circuit in response to the reading step, asynchronously determining a presence of at least one stored frame in the random access memory based on the storing and reading steps, and selectively storing one of the first tracking information and the tracking information corresponding to the read frame in the holding register based on the determined presence of at least one stored frame in the random access memory, the one stored tracking information indicating a read status for the corresponding stored data frame. The asynchronous detection of at least one stored frame assures that the status of stored data may be reliably maintained, despite the presence of non-synchronized clocks operating in respective clock domains. The selective storing of tracking information also ensures that the read status is reliably maintained despite the presence of non-synchronized clocks.

Another aspect of the invention provides a network interface device for storing a data frame comprising a random access memory, a write controller configured for writing the frame into the random access memory at a prescribed location according to a first clock, the write controller storing corresponding first tracking information at the prescribed location following the writing of the frame, a read controller configured for reading the frame from the random access memory according to a second clock independent from the first clock, the read controller outputting second tracking information in response to the reading of the frame, and a synchronization circuit having a holding register, and a selection circuit for selectively storing one of the first tracking information and the second tracking information in the holding register based on an asynchronous detection of a presence of at least one stored frame in the random access memory. Use of the selection circuit and the synchronization circuit to selectively store the first or second tracking information in the holding register enables the synchronization circuit to reconcile potential arbitration issues between the write controller and read controller operating in respective clock domains, by granting priority to the write controller to store the corresponding tracking information if a full data frame is not stored in the random access memory, while granting priority to the read controller if at least one frame is stored in the random access memory. Hence, the present invention provides the advantages of random access memory over FIFO-based buffers, including faster access speeds, smaller memory sizes and faster flushing of non-relevant data, without the introduction of synchronization or memory contention problems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 1, 1A and 1B are block diagrams illustrating an exemplary network interface device including a synchronization circuit for controlling buffer memory controllers according to an embodiment of the present invention.

BEST MODE FOR CARRYING OUT THE INVENTION

The present invention will be described with the example of a network interface device in a packet switched network, such as an Ethernet (IEEE 802.3) network. A description will first be given of a network interface architecture, followed by the arrangement for monitoring the storage of a data frame in a buffer memory, independent of host computer clock and network data clock domains. It will become apparent, however, that the present invention is also applicable to other network interface device systems.

Network Interface Architecture

Figure 1A:
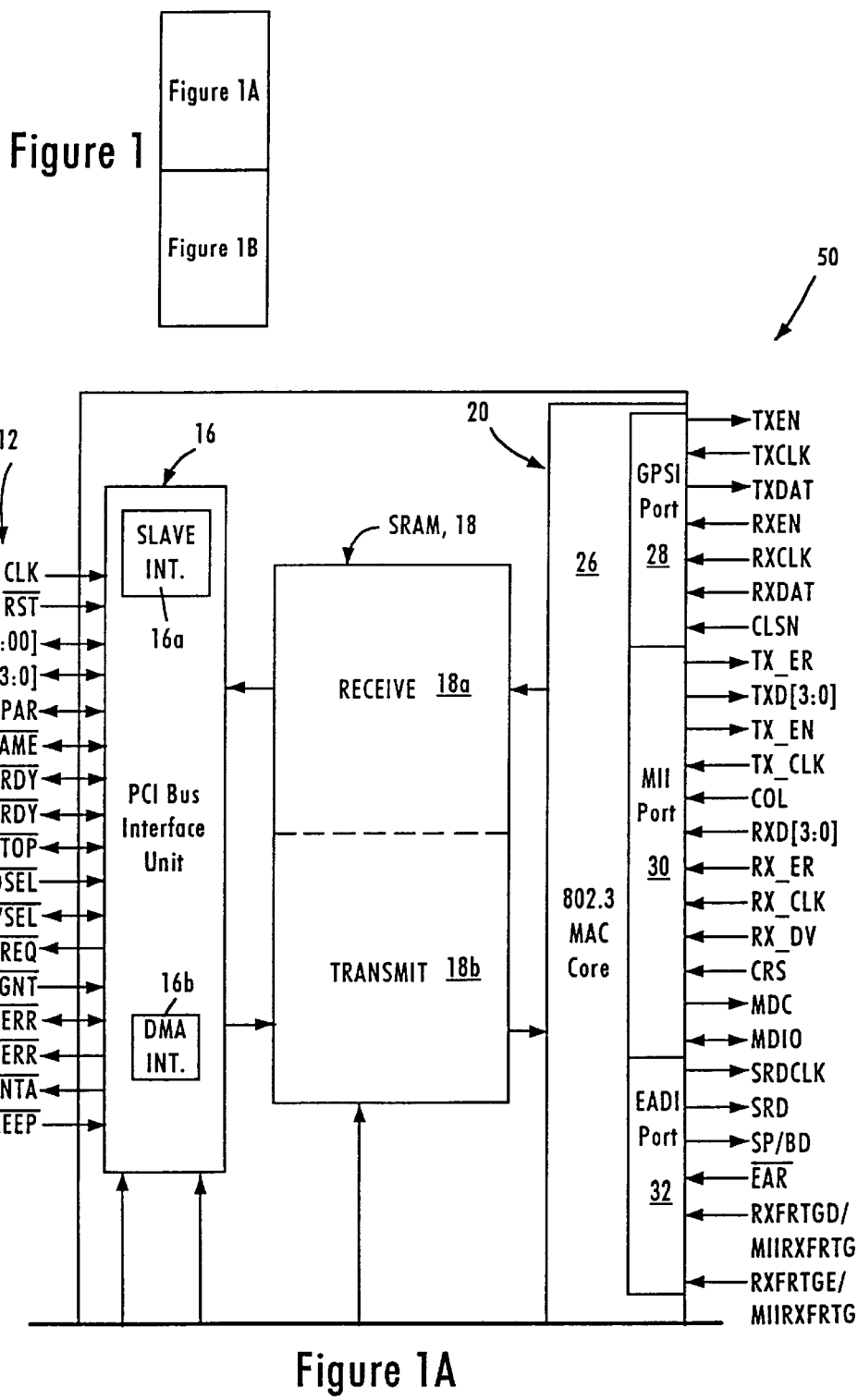
Figure 1B:
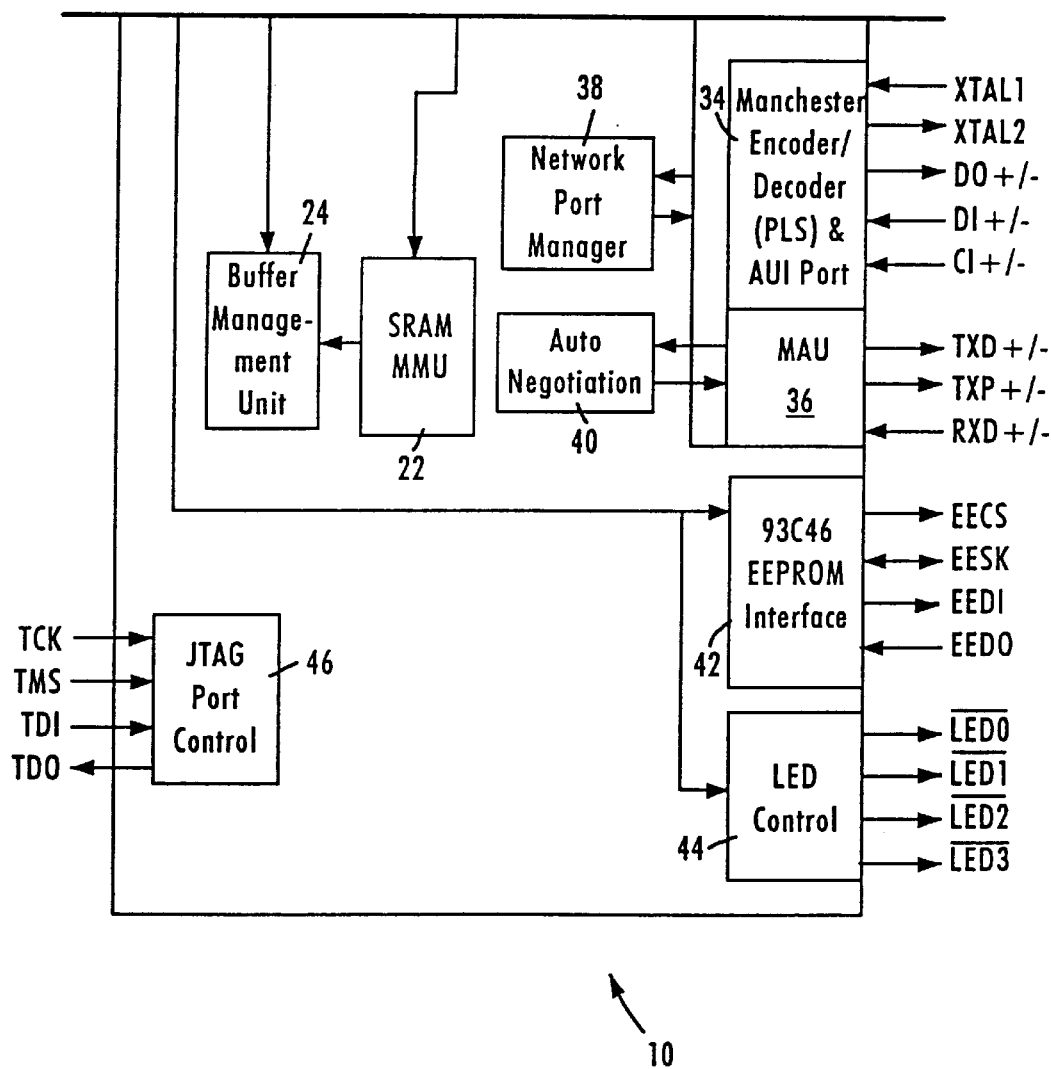

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

Memory Management Architecture

Figure 2:
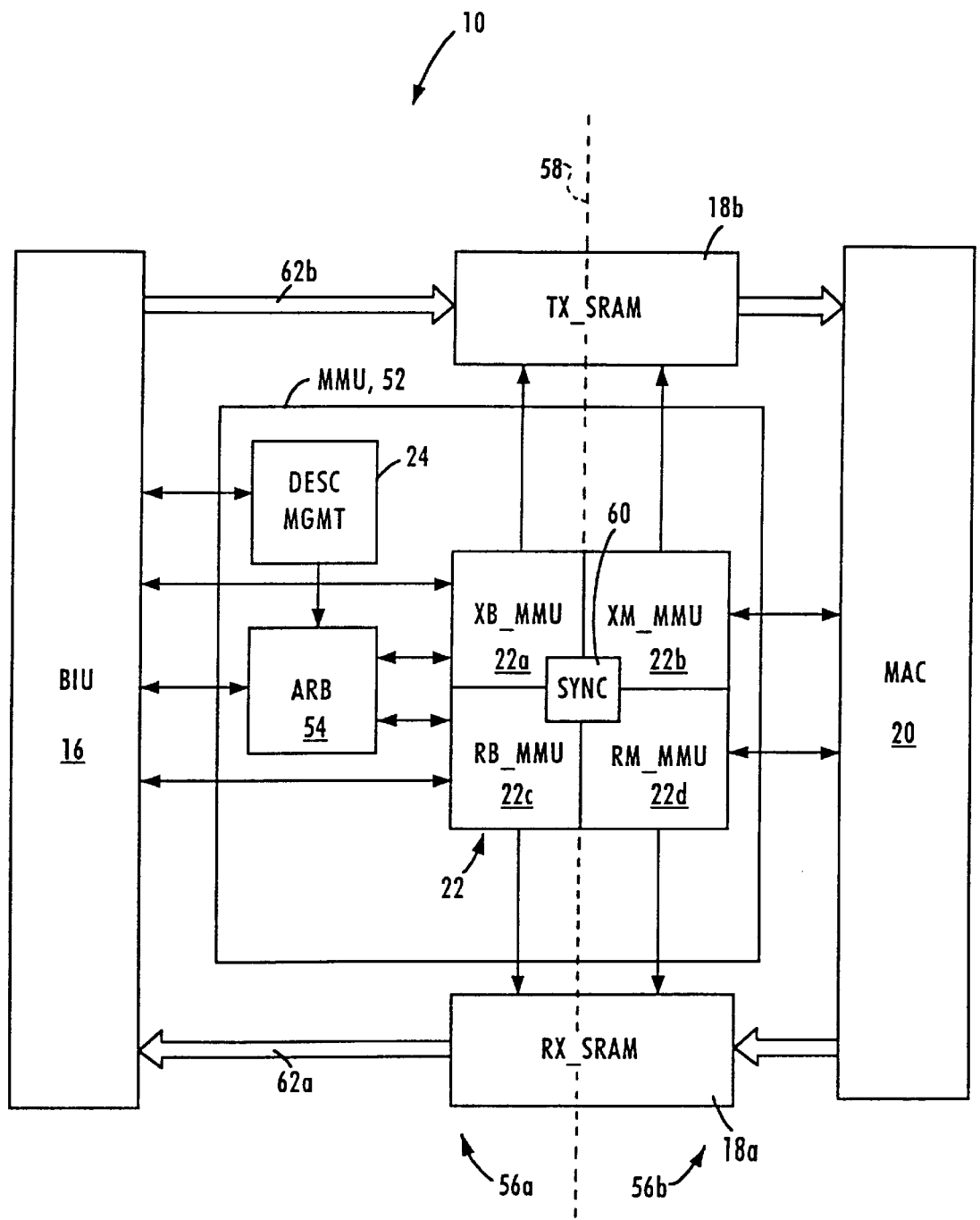
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3:
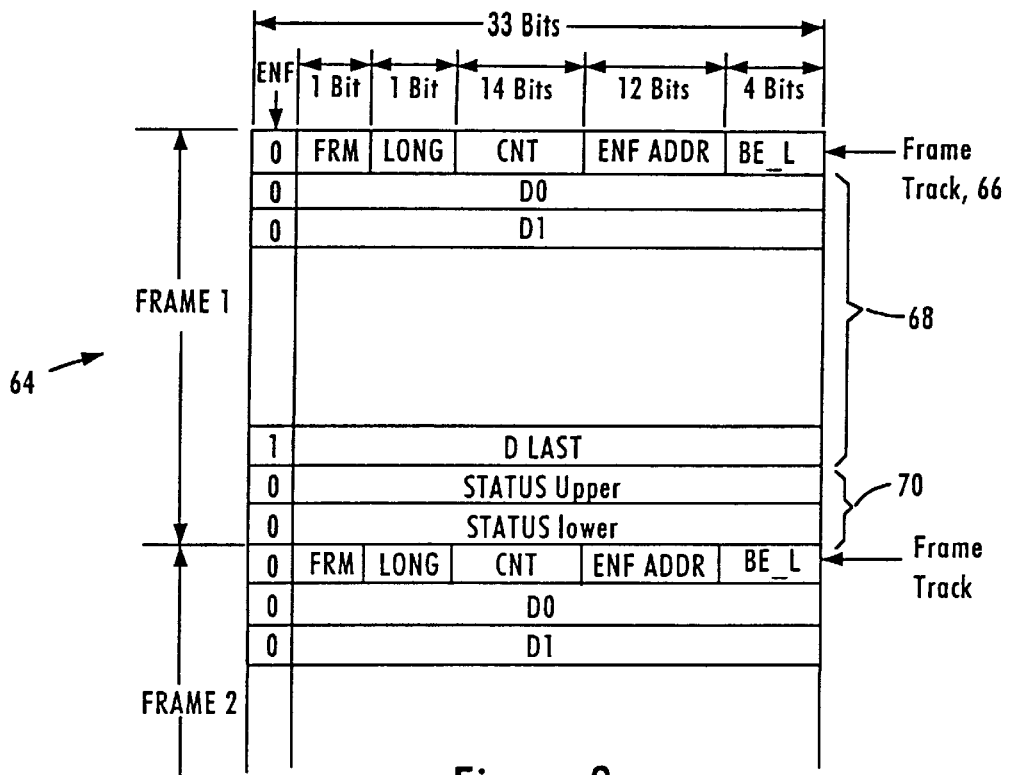
FIG. 3 is a diagram illustrating an exemplary data structure of a data frame stored in the random access memory of FIGS. 1 and 2.

FIG. 3 is a diagram illustrating a data structure of a receive data unit in the RX_SRAM 18a. A similar structure also may be used for storing data in the TX_SRAM 18b. As shown in FIG. 3, each stored data frame 64 includes a frame track field 66 preceding a group of data bytes representing the frame data 68 (i.e., the packet data to be transmitted by the MAC 20), followed by a control field 70. In this case, the RM_MMU 22d stores frame track information 66 and the control field 70 related to the receive data frame 68. The frame track field 66 is used by the RB_MMU 22c to keep track of the location of the corresponding receive data frame 68 in the RX_SRAM 18a. Hence, the frame track 66 enables the RB_MMU 22c to quickly flush a stored data frame 64 having receive data 68 and jump to the beginning of the next stored data frame (e.g., $64_2$), based on an end of frame address field (ENF ADDR), a count (CNT) field specifying the number of DWORDS (D0, D1, . . . , DLAST), and an end of frame (ENF) bit indicating whether the data frame 64 contains valid data ready for reading. The byte enable-last field (BE_L) specifies how many of the bytes in the DLAST field are valid.

Figure 5B:
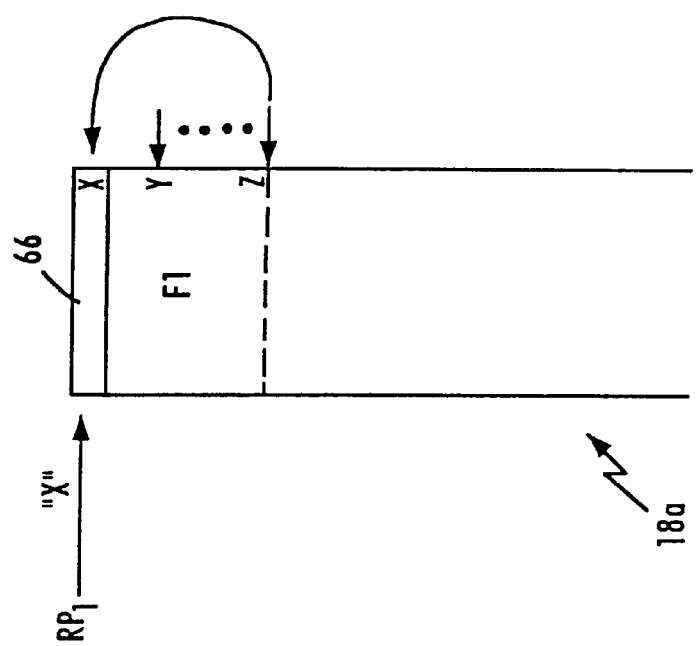
FIGS. 5A and 5B are diagrams illustrating storage conditions when the received memory of FIG. 2 stores at least one full frame of data and less than one full frame of data, respectively.
Figure 5A:
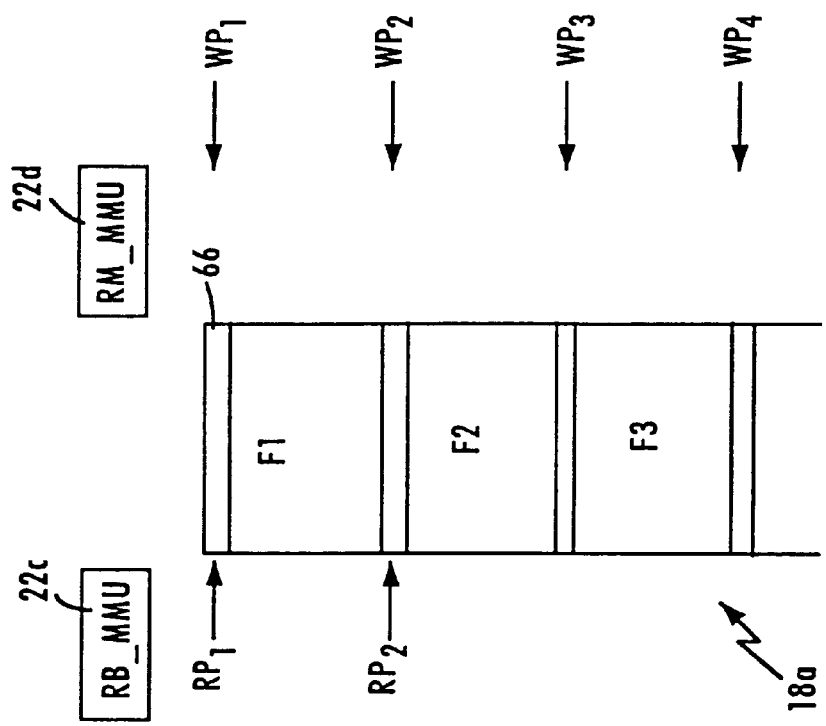

FIG. 5A is a diagram illustrating multiple data frames (F1, F2, etc.) stored in the RX_SRAM 18a. Assume that the RM_MMU 22d is writing a sequence of data frames 64 (frame 1, frame 2, etc.) into RX_SRAM 18a using a write pointer (WP), while the read controller 22c is reading out the data frames from the RX_SRAM 18a to the BIU 16 using a read pointer (RP). If the read controller discards (e.g., flushes) a transmit data frame and desires to jump to the beginning of the next data frame, the synchronization circuit 60 must be able to track the start and beginning of each data frame to ensure that the read controller 22c properly locates the beginning of the next data frame.

The synchronization circuit 60 includes read and write frame counters for each SRAM 18a and 18b in order to enable the corresponding memory management unit to track the number of stored data frames. The memory management unit tracks the number of stored data frames based on the difference between the write frame counter value and the read frame counter value. Since the writing and reading operations occur in two independent clock domains 56, however, a condition may arise as shown in FIG. 5B where the read and write frame counters are about to store the same count values.

For example, assume a read frame counter value and a write frame counter value are stored in binary counters, where a write frame counter has a value (WR+100) and a read frame counter in the second independent clock domain transitions from (RD=011) to (RD=100). Since the clock domain 56a and 56b operate independently of each other, a logic comparator performing a comparison between the write frame counter and read frame counter may erroneously conclude that the read and write frame counters have different values at a point in time where the read frame counter has a transitional value (e.g., 101, 111, or 000) as the read frame counter is being updated. Hence, the attempt to perform an asynchronous comparison between the binary read and write frame counters may cause an erroneous conclusion that the read and write pointers are not equal, causing the read controller to read invalid data from memory location 64 while the write controller is writing the data without the opportunity of having updated the frame track information 66.

One possible solution for preventing asynchronous comparisons during counter transitions is to provide latched outputs for the counter values. However, such an arrangement would severely degrade the timing performance of the random access memory as a buffer device.

Synchronization Circuit Operation

According to the disclosed embodiment, the synchronization circuit 60 includes a read counter and a write counter for each transmit SRAM 18b and receive SRAM 18a, where each counter is configured for counting a number of written (or read) frames by changing a single bit of a counter value in response to a corresponding signal from the associated MMU controller.

Figure 4:
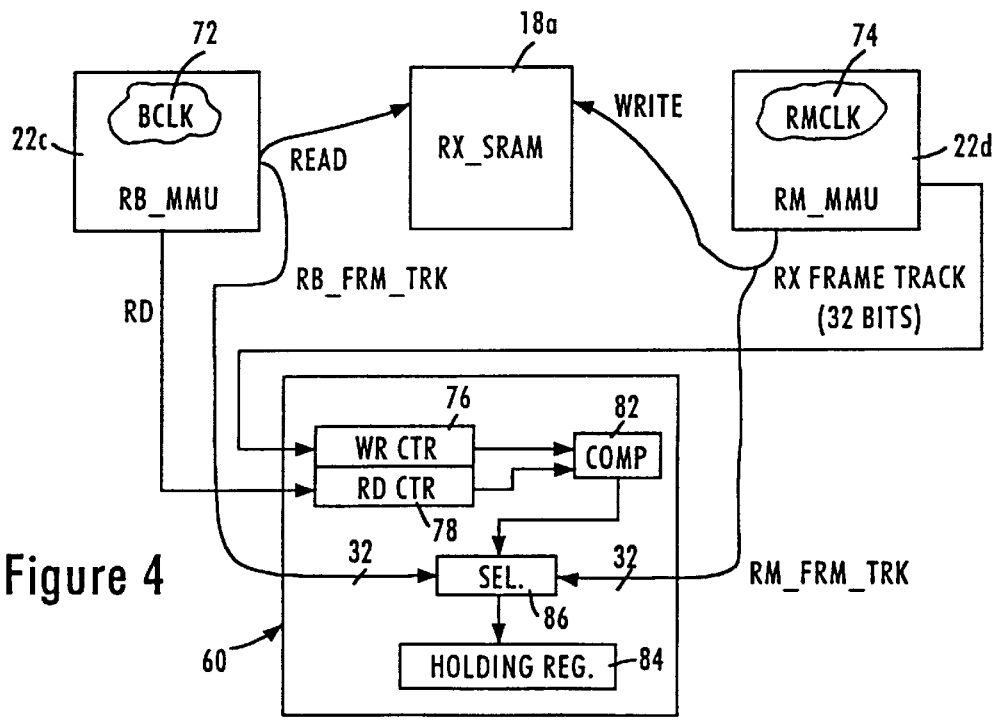
FIG. 4 is a block diagram illustrating in detail the architecture of the memory management unit of FIG. 2.

FIG. 4 is a block diagram illustrating operation of the synchronization circuit 60 with the read and write controllers for the receive SRAM 18a according to an embodiment of the present invention. As shown in FIG. 4, the write controller (RM_MMU) 22d for the receive SRAM 18a is configured for writing a frame (e.g., the data frame 64) into the receive SRAM 18a according to a receive MAC clock (RMCLK) 74 synchronized relative to the network clock domain 56b. The write controller 22d, upon writing an entire data frame 64 into the receive SRAM 18a, outputs a write signal to the synchronization circuit 60 indicating the completed writing of the data frame 64. Specifically, the write controller 22d writes the data frame 64 in FIG. 3 by receiving the frame data 68 from the MAC 20 according to the RMCLK 74. The write controller 22d then reserves a portion (location "X" in FIG. 5B) of the prescribed memory location 64 of the transmit SRAM 18a by first writing null data for the frame track 66 to hold header information. The actual frame data 68 is then written (location "Y"), followed by control information 70 (at location "Z"). Following the writing of the control information 70 at location "Z", the write controller 22d then returns to the frame track field 66 at location "X" and updates the frame track with the appropriate header information, including setting the end of frame address (ENF ADDR), updating the count (CNT) field indicating the number of DWORDS in the frame, the frame bit (FRM), and the ENF bit indicating that the memory location 64 stores valid data. The write controller 22d concurrently supplies the frame track information (RM_FRM_TRK) to the synchronization circuit 60 for storage in a holding resistor 84.

Hence, the write controller 22d outputs the write signal to the synchronization circuit 60 after updating the frame track field 66, at which point the SRAM 18a stores a valid data frame 64 at a prescribed location. As shown in FIG. 5A, successive writing of frames results in outputting a corresponding plurality of frame track values (RM_FRM_TRK) to the holding register 84. Assuming, however, that the read controller 22c attempted to read the first frame F1 from the memory location 64 prior to completion by the write controller 22d, as shown in FIG. 5B, the read controller 22c would obtain invalid data, since the frame track field 66 would not yet be updated with valid data. In addition, the read controller supplies the read frame track information from the accessed memory location (RB_FRM_TRK) to indicate the read status for the holding register 84. Hence, invalid frame track data would be written to the holding register 84 if the read controller attempted a read operation before completion of the corresponding write operation.

According to the disclosed embodiment, the synchronization circuit 60 determines a presence of a complete stored data frame 64 in the random access memory 18a in response to read and write signals and independent of the bus clock 72 and the MAC clock (RMCLK) 74. Specifically, the synchronization circuit 60 includes a write frame counter 76 configured for changing a single bit of a write counter value in response to the write signal output from the write controller 22d. The synchronization circuit 60 also includes a read frame counter 78 configured for changing a single bit of a read counter value in response to the read signal from the read controller 22c. As described above, the read controller 22c is configured for reading the frame 64 from the receive SRAM 18a according to a host bus clock (BCLK) 72, where the read controller 22c outputs a read signal to the synchronization circuit 60 in response to the reading of the frame.

According to the disclosed embodiment, the write frame counter 76 and the read frame counter 78 are implemented as gray code counters, such that only a single bit of a counter value is changed in response to assertion of the status signal from the corresponding memory controller 22. Use of the gray code counter ensures that any asynchronous comparison between the write frame counter 76 and the read frame counter 78 does not result in any erroneous values due to multiple bit transitions that may otherwise occur in counters using binary-format representations.

The gray code counters 76 and 78 output their respective counter values to an asynchronous comparator 82, composed of a plurality of exclusive OR gates. The comparator generates a comparison result indicating the presence of a stored frame based on the first and second counter values, such that the comparator 82 outputs a one or more received frame signal (RX_FRM_ONEM) indicating the presence of at least one stored frame in the receive SRAM 18a if the stored counter values from the write counter 76 and the read counter 78 are unequal.

Storing Frame Track Information

As described above with respect to FIGS. 5A and 5B, the different clock domains 56a and 56b may cause contention problems during the writing of frame track information 66 into the holding register 84, depending on whether there are one or more frames in the memory 18a, as shown in FIG. 5A, or less than one full frame, as shown in FIG. 5B.

The purpose of the holding register 84 is to hold frame track information for the current frame being read from the SRAM. Hence, the synchronization circuit 60 needs to be able to ensure that only valid data is written into the holding register 84 (i.e., frame track data written into the frame track field 66 after having written a complete data frame).

According to the disclosed embodiment, the synchronization circuit 60 includes a selection circuit 86 for selectively storing either the frame track information generated by the write controller (RM_MMU) 22d (e.g., RM_FRM_TRK), or the frame track information generated by the read controller (RB_MMU) 22c (e.g., RB_FRM_TRK). The selection circuit 86 selectively supplies either the first tracking information (RM_FRM_TRK) or the second tracking information (RB_FRM_TRK) to the holding register 84 based on an asynchronous detection of at least one stored data frame in the receive memory 18a. The detection circuit within the synchronization circuit 60, composed of the write frame counter 76, the read frame counter 78 and the comparator 82, asynchronously determines the presence of at least one stored frame, and outputs a one-or-more received frame signal (RX_FRM_ONEM) equal to a value of 1 if the SRAM stores at least one data frame as shown in FIG. 5A. If the memory 18a stores less than a complete frame of data, as shown in FIG. 5B, then the comparator 82 outputs the one-or-more signal as having a value of RX_FRM_ONEM=0. Hence, priority is given to the read controller 22c to write the corresponding frame track information into the holding register 84 if one or more frames are stored in memory 18a as shown in FIG. 5A, and grants priority to the write controller 22d if less than one full frame (i.e., a complete frame) is stored in memory 18a, as shown in FIG. 5B.

Figure 6:
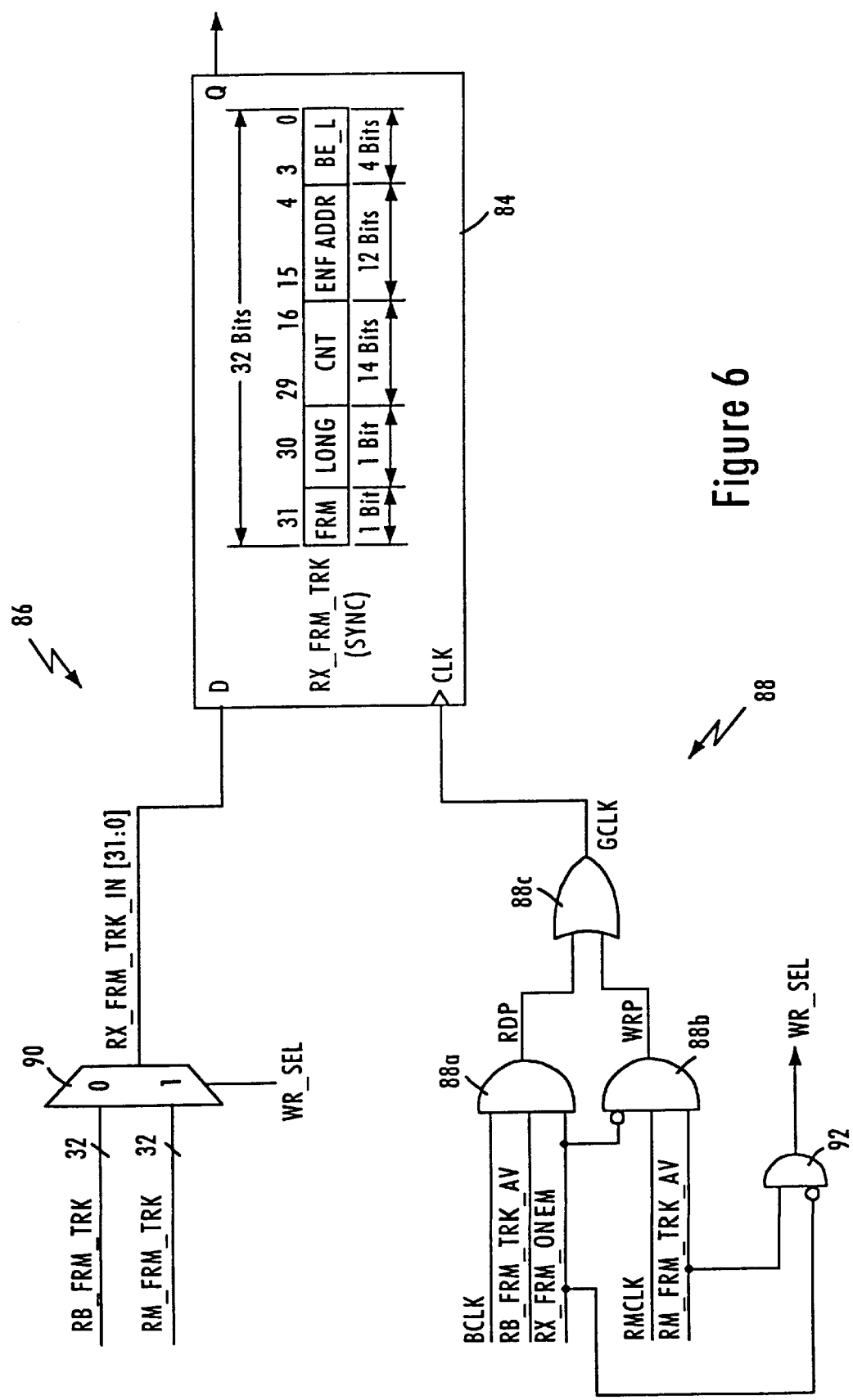
FIG. 6 is a block diagram illustrating the selection circuit and holding register in the synchronization circuit of FIG. 4.

FIG. 6 is a block diagram illustrating the selection circuit 86 and the holding register 84 according to an embodiment of the present invention. As shown in FIG. 6, the selection circuit 86 includes a generic clock circuit 88 configured for supplying a gated clock signal (GCLK) based upon the bus clock (BCLK), the receive MAC clock (RMCLK), and the one-or-more signal (RX_FRM_ONEM) from the comparator 82. Specifically, the generic clock circuit 88 includes AND gates 88a and 88b for generating read priority and write priority signals, respectively, and an OR gate 88c for generating the gated clock signal based on the priority signals output by the AND gates 88a and 88b. The AND gate 88a outputs a read priority (RDP) signal synchronous with the bus clock (BCLK) if the one or more signal equals one, (e.g., RX_FRM_ONEM=1) and the read controller 22c outputs an availability signal (RB_FRM_TRK_AV) indicating availability of the frame track signal (RB_FRM_TRK). The AND gate 88b performs the same operation for the write controller 22d, namely outputting a write priority (WRP) signal synchronous with the receive MAC clock (RMCLK) upon the availability of the frame track signal from the write controller 22, as indicated by the signal RM_FRM_TRK_AV=1, and when the one or more signal equals zero (e.g., RX_FRM_ONEM=0).

The selection circuit 86 also includes an input selector 90 for selectively supplying either the frame track information from the read controller 22c (RB_FRM_TRK) or the frame track information generated by the write controller 22d (RM_FRM_TRK) as an output signal (RX_FRM_TRK_IN) in response to a selection signal (WR_SEL). The selection signal WR_SEL is generated by an AND gate 92 based on the one or more signal (RX_FRM_ONEM). Hence, if the one or more signal equals one, then the select signal is zero (WR_SEL=0), such that priority is given to the read controller 22c to supply the corresponding frame track information to the holding register 84. However, if the one or more signal equals zero, corresponding to the condition of FIG. 5B, the selection signal (WR_SEL) is set to one when the frame track information is available from the RM_MMU 22d. Once the frame track information is available, the RM_FRM_TRK information is supplied to the holding register 86 concurrent with the write priority signal output by the AND gate 88b, output by the OR gate 88c as a generic gated clock signal (GCLK) to a holding register 84 concurrent with the frame track information from the RM_MMU 22d.

The holding register 84 is a 32-bit delay flip flop that stores the updated frame track information (RX_FRM_TRK_IN) from the selector 90 in response to the gated clock signal (GCLK) output by the clock circuit 88.

As shown in FIG. 6, the holding register 84 is configured for holding the 32 bit-wide frame track information, enabling the read controller RB_MMU 22c to determine the read status, independent of the clock domains. Specifically, the stored frame track includes a frame field (FRM), a long frame field (LONG), a byte count field (CNT), an end of frame field (ENF_ADDR), and a byte enable (BE_L) field. The frame field when set to 1 indicates that the entire received frame is stored in the RX_SRAM 18a. Hence, if the frame field in the holding register 84 equals 1, the RB_MMU 22c can use this information to identify a valid data frame available for reading. However, if the frame field in the holding register 84 equals 0, the RB_MMU 22 knows the stored frame track value is invalid. The long frame field indicates that the expected receive frame length is greater than a prescribed threshold.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of processing data frames in a network interface device, comprising:

storing each data frame received by the network interface device and corresponding first tracking information in a random access memory at a prescribed memory location using a write controller operating according to a first clock;

supplying the corresponding first tracking information to a synchronization circuit having a holding register in response to the storing step;

reading a data frame from the random access memory using a read controller operating according to a second clock independent from the first clock;

supplying the corresponding tracking information for the read data frame to the synchronization circuit in response to the reading step;

asynchronously determining a presence of at least one stored data frame in the random access memory based on the storing and reading steps; and selectively storing one of the first tracking information and the tracking information corresponding to the read data frame in the holding register based on a determination that at least one data frame is stored in the random access memory, the tracking information selected for storing indicating a read status for the corresponding stored data frame.

2. The method of claim 1, wherein the storing step comprises:

receiving a data frame from a media access controller (MAC) according to a MAC receive clock as the first clock;

reserving a first portion of the prescribed memory location for the first tracking information;

writing the data frame at a second portion of the prescribed memory location; and following the writing step, updating the first portion with the first tracking information.

3. The method of claim 2, wherein the updating step comprises generating the first tracking information including a byte count indicating a number of bytes in the data frame received from the MAC, an end of frame address specifying a memory address for an end of the prescribed memory location, and a frame bit indicating a valid status of the stored data frame and the first tracking information.

4. The method of claim 3, wherein the updating step further comprises generating for the first tracking information a byte enable field indicating a number of valid data bytes at an end of the stored data frame.

5. The method of claim 1, wherein the selectively storing step comprises:

selecting the first tracking information for storage in the holding register if the determining step determines an absence of the at least one stored data frame in the random access memory; and selecting the tracking information corresponding to the read data frame for storage in the holding register if the determining step determines the at least one stored data frame is in the random access memory.

6. The method of claim 5, the selectively storing step further comprising:

generating a first gated clock signal in response to a write availability signal from the write controller, the first clock, and a signal indicating the absence of the at least one stored data frame in the random access memory;

generating a second gated clock signal in response to a read availability signal from the read controller, the second clock, and a signal indicating the presence of the at least one data frame in the random access memory; and storing the selected tracking information into the holding register in response to one of the first gated clock signal and the second gated clock signal.

7. The method of claim 1, wherein the determining step comprises generating a one-or-more stored frame signal indicating that the at lease one data frame is stored in the random access memory, and the selectively storing step comprises supplying the one-or-more stored frame signal as an input to a selection circuit for selecting one of the first tracking information and the tracking information for the read data frame.

8. The method of claim 7, wherein the selectively storing step further comprises:

outputting the selected one of the first tracking information and the tracking information for the read data frame from the selection circuit as an input to the holding register;

generating a generic gated clock signal based on the one-or-more stored frame signal, the first clock, and the second clock; and storing the input to the holding register in response to the generic gated clock signal.

9. A network interface device for storing data frames, comprising:

a random access memory;

a write controller configured for writing each data frame received by the network interface device into the random access memory at a prescribed location according to a first clock, the write controller storing corresponding first tracking information at the prescribed location following the writing of said each data frame;

a read controller configured for reading said each data frame from the random access memory according to a second clock independent from the first clock, the read controller outputting second tracking information in response to the reading of said each data frame; and a synchronization circuit having a holding register, and a selection circuit for selectively storing one of the first tracking information provided by the write controller and the second tracking information provided by the read controller in the holding register based on an asynchronous detection of a presence of at least one stored data frame in the random access memory.

10. The network interface device of claim 9, wherein the synchronization circuit comprises a detection circuit for asynchronously determining the presence of at least one stored data frame in the random access memory, the detection circuit outputting a one-or-more signal indicating the presence of said at least one data frame stored in the random access memory.

11. The network interface device of claim 10, wherein the selection circuit comprises:

a generic clock circuit configured for supplying a generic gated clock signal based on the first clock, the second clock, and the one-or-more signal; and an input selector for selectively supplying one of said first and second tracking information to the holding register based on the one-or-more signal, wherein the holding register stores the supplied said one of said first and second tracking information in response to the generic gated clock signal.

12. The network interface device of claim 9, wherein the synchronization circuit further comprises an asynchronous data frame detector configured for detecting the presence of at least one stored data frame in the random access memory independent of the first and second clocks.

13. The network interface device of claim 12, wherein the asynchronous frame detector comprises:

a write frame counter counting a number of data frame writings to the random access memory and configured for changing a single bit of a write counter value in response to a received write signal from the write controller;

a read frame counter counting a number of data frame readings from the random access memory and configured for changing a single bit of a read counter value in response to a received read signal from the read controller; and a comparator for comparing the write counter value with the read counter value and generating a detection signal indicating the presence of the at least one stored data frame in the random access memory when said comparator detects a difference between the write frame counter value and the read frame counter value.

14. The network interface device of claim 9, further comprising:

a media access controller (MAC) for supplying a data frame for storage in the random access memory and the first clock from a network media; and a host bus interface for transferring a stored data frame from the random access memory and for supplying the second clock from a host bus.

15. The network interface device of claim 14, wherein the holding register stores a read status for the stored data frame, including a byte count indicating a number of bytes in the data frame received from the MAC, an end of frame address specifying a memory address for an end of the prescribed memory location, and a frame bit indicating a valid status of the stored data frame and the first tracking information.

* * * * *